(12) United States Patent
Litz

(10) Patent No.: US 7,105,087 B2
(45) Date of Patent: Sep. 12, 2006

(54) HEXA-VALENT CHROMIUM REMOVAL FROM AQUEOUS MEDIA USING FERROUS-FORM ZEOLITE MATERIALS

(75) Inventor: John E. Litz, Lakewood, CO (US)

(73) Assignee: WRT International LLC, Wheat Ridge, CO (US)

( * ) Notice: Subject to any disclaimer, the term of this patent is extended or adjusted under 35 U.S.C. 154(b) by 174 days.

(21) Appl. No.: 10/666,654

(22) Filed: Sep. 17, 2003

(65) Prior Publication Data

US 2004/0124150 A1 Jul. 1, 2004

Related U.S. Application Data

(60) Provisional application No. 60/411,399, filed on Sep. 17, 2002.

(51) Int. Cl.
*B01D 15/08* (2006.01)

(52) U.S. Cl. .................. 210/188; 210/198.2; 210/263; 210/913

(58) Field of Classification Search ................ 210/656, 210/662, 679, 684, 188, 198.1, 198.2, 263, 210/913
See application file for complete search history.

(56) References Cited

U.S. PATENT DOCUMENTS

| | | | |
|---|---|---|---|
| 2,632,720 A | 3/1953 | Perry | |
| 3,700,592 A * | 10/1972 | De Pree | 210/674 |
| 3,723,308 A | 3/1973 | Breck | 210/38 |
| 3,933,631 A | 1/1976 | Adams | 210/34 |
| 4,265,634 A * | 5/1981 | Pohl | 436/161 |
| 4,375,568 A * | 3/1983 | Izod et al. | 568/758 |
| 4,389,293 A * | 6/1983 | Mani et al. | 204/517 |
| 4,686,198 A | 8/1987 | Bush et al. | |
| 4,695,387 A | 9/1987 | Berry et al. | 210/676 |
| 4,765,779 A | 8/1988 | Organ | |
| 4,800,024 A | 1/1989 | Elfline | 210/665 |
| 4,995,956 A * | 2/1991 | Mani | 204/522 |
| 5,043,072 A * | 8/1991 | Hitotsuyanagi et al. | 210/638 |
| 5,084,184 A | 1/1992 | Burns | |
| 5,200,046 A * | 4/1993 | Chlanda et al. | 204/534 |
| 5,207,914 A * | 5/1993 | Lin | 210/635 |
| 5,512,178 A | 4/1996 | Dempo | |
| 5,556,545 A | 9/1996 | Volchek et al. | 210/651 |
| 5,575,919 A | 11/1996 | Santina | |
| 5,591,346 A | 1/1997 | Etzel et al. | 210/668 |
| 5,651,883 A * | 7/1997 | Horwitz et al. | 210/198.2 |
| 5,679,256 A | 10/1997 | Rose | 210/662 |
| 5,695,642 A * | 12/1997 | Greenleigh et al. | 210/638 |
| 5,707,514 A * | 1/1998 | Yamasaki et al. | 210/151 |

(Continued)

OTHER PUBLICATIONS

Abdo et al., "A new technique for removing hexavalent chromium from waste water and energy generation via galvanic reduction with scrap iron", *Energy Conservation and Management*, vol. 39, No. 9, pp. 943-951, Jul. 1998. (Abstract).

(Continued)

*Primary Examiner*—Ernest G. Therkorn
(74) *Attorney, Agent, or Firm*—Dorsey & Whitney LLP

(57) ABSTRACT

Systems and methods are provided for the removal and disposal of chromium form an aqueous medium. The systems and methods include the removal of chromium from a source by contact with either natural or synthetic zeolite that has been modified with a ferrous ion or other like substance. The spent zeolite is disposed of and replaced with freshly modified zeolite. In some cases the systems and methods are performed under de-oxidizing conditions.

3 Claims, 5 Drawing Sheets

U.S. PATENT DOCUMENTS

| | | | | |
|---|---|---|---|---|
| 5,711,015 | A | | 1/1998 | Tofe |
| 5,725,753 | A | * | 3/1998 | Harada et al. ............... 205/746 |
| 5,733,434 | A | * | 3/1998 | Harada et al. ............... 205/746 |
| 5,876,685 | A | * | 3/1999 | Krulik et al. ................ 423/488 |
| 5,951,874 | A | * | 9/1999 | Jangbarwala et al. ....... 210/662 |
| 6,042,731 | A | | 3/2000 | Bonnin ........................ 210/679 |
| 6,531,063 | B1 | | 3/2003 | Rose ........................... 210/631 |
| 6,582,605 | B1 | * | 6/2003 | Krulik et al. ................ 210/638 |
| 6,613,230 | B1 | * | 9/2003 | Krulik et al. ................ 210/638 |
| 6,663,781 | B1 | | 12/2003 | Huling et al. |
| 6,753,186 | B1 | | 6/2004 | Moskoff |
| 2003/0132155 | A1 | * | 7/2003 | Litz et al. .................... 210/284 |

OTHER PUBLICATIONS

Ames, L. L., "Zeolitic Removal of Ammonium Ions from Agricultural and Other Wastewaters", 13th Pacific Northwest Industrial Waste Conference, Washington State University, pp. 135-152, 1967.

Barrado et al., "Characterisation of solid residues obtained on removal of Cr from waste water", Journal of Alloys and Compounds, vol. 335, pp. 203-209, Mar. 14, 2002. (Abstract).

Bishop, D. F. et al., "Physical-Chemical Treatment of Municipal Wastewater", Journal of Water Pollution Control Federation, vol. 44, No. 3, pp. 361-371, 1972.

çelik, M. S. et al., "Removal of Ammonia by Natural Clay Minerals Using Fixed and Fluidised Bed Column Reactors", Water Science and Technology: Water Supply, vol. 1, No. 1, pp. 81-88, 2001.

Chmielewska-Horváthová, E., "Use of Clinoptiloite in Ammonia Removal from Wastewater in and Outside Slovakia", Mineralia Slovavaca, vol. 27, No. 4, pp. 268-272, 1995.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

DOWEX RSC, "Radium Removal from Groundwater with DOWEX RSC Radium Selective Complexer Resin", DOWEX Ion Exchange Resins, http://www.dow.com/liquidseps, 2 pp. 2001.

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizona, Pergamon Press, pp. 463-470, 1978.

Han, Ihn Sup, "Environmental engineering parameters affecting the removal of hexavalent chromium and nitroaromatic compounds from water by granular activated carbon", Thesis, 178 pages, 1999. (Abstract).

Haralambous, A. et a., "The Use of Zeolite for Ammonium Uptake", Water Science and Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Wastewater Purification in Hungary Using Natural Zeolites ", Natural Zeolites '93, International Committee Natural Zeolites, Brockport, New York, pp. 341-350, 1993.

Klieve,J. H. et al., "An Evaluation of Pretreated Natural Zeolites for Ammonium Removal", Water Research—The Journal of the International Association on Water Pollution Research, vol. 14, No. 2, Pergamon Press, pp. 161-168, 1980.

Koon, J. H. et al., "Optimization of Ammonia Removal by Ion Exchange Using Clinoptilolite", SERL, Report No. 71-5, University of California, Berkeley, California, pp. 1-189, 1971.

Koon, J. H. et al., "Ammonia Removal from Municipal Wastewaters by Ion Exchange", Journal Water Pollution Control Federation, vol. 47, No. 3, pp. 448-465, 1975.

Kutsy, V. G., "The Removal of Co; 2; +, Ni; 2; +, Cu; 2; +, Zn; 2; +, Mn; 2; +, Fe; 3; + and Cr; 6; + out of Water Solutions by Phosphates of Metals", Ekotekhnologii I Resursosberezhenie, Part 1, pp. 42-45, 2002, (Abstract).

Lin, et al., "The removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, 1995. (Abstract).

McLaren, J. R. et al., "Factors Affecting Ammonia Removal by Clinoptilolite", Journal of the Environmental Engineering Division, ASCE, vol. 1973, pp. 429-444, 1973.

Melitas et al., "Kinetics of soluble chromium removal from contaminated water by zero valent iron media: corrosion inhibition and passive oxide effects", Environmental Science Technology, vol. 35, No. 19, pp. 3948-3953, 2001. (Abstract).

Mercer, B. W., "Clinoptilolite in Water-Pollution Control", The Ore Bin, vol. 31 No. 11, pp. 209-213, 1969.

Mercer, B. W., "Ammonia Removal from Secondary Effluents by Selective Ion Exchange", Journal Water Pollution Control Federation, vol. 42, No. 2, pp. R95-R107, 1970.

Philipot et al., "Hexavalent Chromium Removal from Drinking Water", Water Science and Technology, vol. 17, No. 6/7, pp. 1121-1132, 1985 (Abstract).

Sarre et al., "Chromium removal in water by modified cellulose", Journal of Water Science, vol. 1, No. 1-2, pp. 55-71, 1988. (Abstract).

Semmens, M. J. et al., "Biological Regeneration of Ammonium-Saturated Clinoptilolite. II The Mechanism of Regeneration and Influence of Salt Concentration", Environmental Science & Technology, vol. 11, pp. 260-265, 1977.

Semmens, M. J. et al. "Nitrogen Removal by Ion Exchange: Biological Regeneration of Clinoptilolite", Journal of the Water Pollution Control Federation, vol. 49, No. 12, pp. 2431-2444, 1977.

Semmens, M. J. et al., "Clinoptilolite Column Ammonia Removal Model", Journal of the Environmental Engineering Division, Proceedings of the American Society of Civil Engineers, vol. 104, No. EE2, pp. 231-244, 1978.

Semmens, M. J. et al., "The Regeneration of Clinoptilolite by Biologically Restored Brine", University of Illinois, Water Resources Center, Research Report No. 139, pp. 1-1 through C-10, 1979.

Semmens, M. J. et al., "Ammonium Removal by Ion Exchange: Using Biologically Restored Regenerant", Journal of Water Pollution Control Federation, vol. 51, Issue 12, (Dec. 1979), pp. 2928-2940.

Semmens, M. J., "Ammonium Removal by Clinoptilolite Using Biologically Assisted Regeneration", 5th International Conference on Zeolites, Naples, Florida, pp. 795-804, 1980.

Slechta, A. F. et al., "Water Reclamation Studies at th South Lake Tahoe Public Utility District", Journal of the Water Pollution Control Federation, vol. 39, pp. 787-814, 1967.

Smith, S. A. et al., "Tahoe-Truckee Water Reclamation Plant. First Year Review", Water Reuse Symposium, vol. 2, pp. 1435-1445, 1979.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", Zeolites, vol. 4, No. 2, pp. 191-195. 1984.

* cited by examiner

HEXA-VALENT CHROMIUM REMOVAL FROM AQUEOUS MEDIA USING FERROUS-FORM ZEOLITE MATERIALS

CROSS REFERENCE TO RELATED APPLICATIONS

This non-provisional patent application claims priority to U.S. Provisional Application Ser. No. 60/411,399, filed on Sep. 17, 2002, entitled SIX-VALENT CHROMIUM REMOVAL FROM AQUEOUS MEDIA USING FERROUS-FORM ZEOLITE MATERIALS and is herein incorporated by reference.

FIELD OF THE INVENTION

The invention generally relates to the removal of chromium from aqueous media. More specifically, the invention provides systems and methods for effectively removing hexa-valent chromium from aqueous media, and in particular, for removing hexa-valent chromium from water sources, such as, a ground water source contaminated with hexa-valent chromium.

BACKGROUND OF THE INVENTION

Cities and towns throughout the world depend on clean potable water supplies. The dependence on clean water has increased as the population of the world has increased, especially as industrial use of rivers and lakes have become commonplace. The increased industrial use of fresh water supplies has resulted in a corresponding decrease in water quality throughout the world, due principally to industrial related release of pollutants into the water supplies. The decrease in water quality is contravening to the world's increased dependence on clean potable water supplies, requiring a concerted effort toward both minimizing the release of pollution into the water supplies and removing existing pollution in water supplies throughout the world.

One particularly concerning pollutant in many water supplies is hexa-valent chromium. Hexa-valent chromium is a valence of chromium, a metallic element of atomic number 24, group VIB of the periotic table, whose ions can form many different coordinated compounds in aqueous solution. Hexa-valent chromium has been used in numerous industrial applications, for example, as an alloying and plating element on metals and plastic substrates, as a protective coating within the automobile industry, as a biocide in cooling waters, and as a constituent of inorganic pigments. Due to its widespread use in numerous manufacturing processes in numerous geographic locations, over a longer period of time, six-valent chromium and chromium containing compounds, have found their way into many of the water supplies of the world. This especially true for ground water supplies in and around locations that participated in the above described industrial applications.

Hexa-valent chromium has been shown to be carcinogenic, i.e., a cause of cancer, and corrosive to tissue, i.e., causing ulcers and dermatitis over prolonged contact with the skin. High or even moderate levels of hexa-valent chromium in a water supply is therefore a major health concern for those individuals consuming or coming in contact with such water supply. Therefore, there is a need to find efficient, cost effective hexa-valent-chromium removal systems for use on water sources through the world.

Conventional methods for removing hexa-valent chromium ($Cr^{+6}$) from water supplies have focused on either anion exchange resins or chromium reduction and precipitation techniques. In particular, where the $Cr^{+6}$ is at very low concentrations, an ion exchange resin is utilized for its removal. However, where the $Cr^{+6}$ is at higher concentrations, the $Cr^{+6}$ is first reduced to $Cr^{+3}$ and precipitated out of solution as chromium hydroxide ($Cr(OH)_3$) (requiring the use of sulfur dioxide, sodium sulfate, sodium metabisulfite, and zero-valent iron). Note that chromium hydroxide has very low solubility between pH 5 and 10, i.e., the range of pH for most water supplies. These commercial techniques for removal of $Cr^{+6}$ from water supplies therefore require either the use of expensive ion exchange resins or reduction to form a precipitate of the $Cr^{+3}$ from the water source.

Against this backdrop the present invention was developed.

BRIEF SUMMARY OF THE INVENTION

The present invention provides systems, methods and compositions for the removal of chromium and in particular $Cr^{+6}$ from an aqueous medium. Embodiments of the present invention utilize modified zeolite adsorption material having high capacity for the removal of chromium form an aqueous medium. One such modified adsorption material is ferrous-form zeolite.

Embodiments of the present invention also provide methods and compositions for the generation of ferrous-form zeolite having at least 0.1 meq ferrous iron/gram. Typically, the modified zeolite has between 0.6 and 0.8 meq ferrous iron/gram. Embodiments of the present invention also provide methods and systems where the aqueous medium is de-oxygenated prior to entry into the chromium removal system.

These and various other features as well as advantages which characterize the invention will be apparent from a reading of the following detailed description and a review of the appended claims.

DETAILED DESCRIPTION OF THE INVENTION

Figure 1:
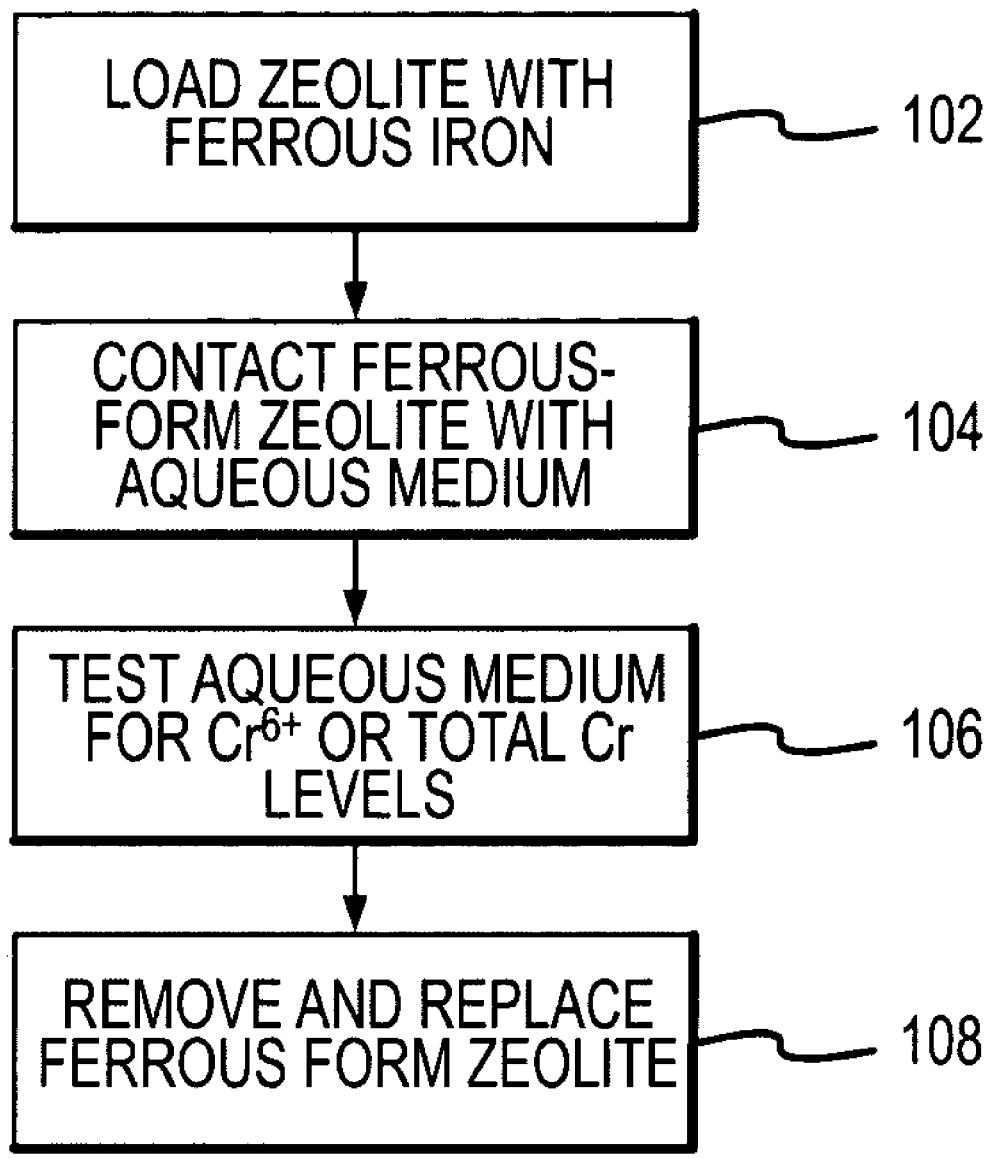
FIG. 1 illustrates a flow diagram of $Cr^{+6}$ removal from an aqueous medium in accordance with embodiments of the present invention.

Definitions:

The following definitions are provided to facilitate understanding of certain terms used frequently herein and are not meant to limit the scope of the present disclosure.

"Aqueous medium" refers to water or any liquid made from, with, or by water. The term includes liquids where water is present at >50 vol %. In most cases the aqueous medium is water with dissolved solution such as hexa-valent chromium salts. In some cases, aqueous medium or media is contaminated with $Cr^{+6}$. For example, aqueous medium may be ground water supplies contaminated with $Cr^{+6}$ where the ground water supply is adjacent and/or in the vicinity of an automobile manufacturing plant or other source of $Cr^{+6}$.

"Feed" or "first aqueous medium" or "first aqueous sample" refers to an aqueous medium before treatment with the systems, methods and/or compositions of the present invention, for example, a flowing water source before it enters a water treatment facility or an underground water supply before it enters the systems of the present invention.

"Maximum Contaminant Level" is the highest level of contamination that is allowed in drinking water in the United States, taking into account best treatment technology and cost. These standards are typically enforceable. Note that Maximum Contaminant Level standards are envisioned to encompass or correspond to the same approximate standards in countries outside the United States, and in many cases are enforceable in those countries.

"Zeolite" refers to a natural and/or synthetic zeolite. Natural zeolites are hydrated silicate of aluminum and either sodium or calcium or both, for example clinoptilolite and chabazite. Synthetic zeolites are made by a number of well known processes, for example gel or clay processes, which form a matrix to which the zeolite is added. Example synthetic zeolites include Linde® AW-30 and Zeolon® 900.

"Remove" refers to the detectable decrease of a target material, for example $Cr^{6+}$, from a feed, for example ground water. Typically, removal of $Cr^{+6}$ from an aqueous feed is at least 50%, preferably at least 75% and most preferably at least 90%, from the original levels in the zeolite treated feed. Typically, chromium is removed from a first level to a second lower level using the embodiments of the present invention.

"Absorb" and "adsorb" refer to the same basic principle of one substance being retained by another substance. The processes can include attraction of one substance to the surface of another substance or the penetration of one substance into the inner structure of another substance. The present invention contemplates that ferrous-form zeolite can either absorb and/or adsorb hexa-valent chromium out of an aqueous medium and that for purposes of the present invention, the two principles are interchangeable. Other terms used to describe this interaction include binding or trapping, each of which is contemplated to be within the definition of absorption and/or adsorption.

Embodiments of the present invention provide methods, systems and compositions for removal of $Cr^{+6}$ from an aqueous medium, for example, a source of chromium contaminated ground water. In general, the methods, systems and compositions of the present invention rely upon modified zeolite absorption columns, for example ferrous-form loaded zeolite columns, that have the capacity to reduce the $Cr^{+6}$ to $Cr^{+3}$, thereby removing it from the target medium. Several similarly related zeolite modified adsorption columns are envisioned to be within the scope of the present invention, including ferrous-form zeolite, manganese-form zeolite, and other more expensive or non-practical metallic ions.

Generation of Ferrous-Form Zeolite:

Ferrous-form zeolite is generated when ferrous-iron is loaded onto zeolite. With regard to the zeolite used as a base material in generating ferrous-form zeolite, either natural or synthetic types can be used. Compositionally, zeolites are similar to clay minerals, where zeolites are natural hydrated silicate of aluminum and either sodium, calcium or a mixture of both. However, unlike clays, which have a layered crystalline structure (similar to a deck of cards that is subject to shrinking and swelling as water is absorbed), zeolites have a rigid three-dimensional crystalline structure, for example a honeycomb-like crystalline structure. Zeolites' rigid honeycomb-like structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for binding ferrous iron.

There are a number of natural zeolites useful in the context of the present invention, including, clinoptilolite, chabazite, phillipsite, mordenite, analcite, heulandite, stilbite, thomosonite, brewsterite, wellsite, harmotome, leonhardite, eschellite, erionite, epidesmine, and the like. The natural zeolites of the present invention differ in density, cation selectivity, molecular pore size, and cation affinity. For example, clinoptilolite has 16% more void volume and pores, and is as much as 0.2 mm larger in average diameter than analcime, another common zeolite. Clinoptilolite is a preferred natural zeolite useful in the generation of ferrous-form zeolite. In addition, natural zeolites having particle sizes from 10×60 mesh and preferably 20×40 mesh, and most preferably 20×50 mesh, are most useful in the present invention. Zeolite fines are typically removed before use in the present invention to prevent plugging in the tanks of the present invention (see below).

Tables 1 and 2 provide a list of companies that presently produce zeolite minerals in either the United States or Canada. Table 1 provides a chemical analysis of the companies zeolite materials, and Table 2 provides the physical properties of the corresponding zeolite materials. These Tables is provided as illustrative of the type of zeolite material that can be purchased for large scale use in the generation of ferrous-form zeolite.

TABLE 1

| | | Chemical Analysis (Expressed in Weight %) | | | | | | | |
|---|---|---|---|---|---|---|---|---|---|
| Company | Location | $Na_2O$ | $K_2O$ | CaO | MgO | $SiO_2$ | $Al_2O_3$ | $TiO_2$ | $Fe_2O_3$ |
| Addwest Minerals | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |
| Stellhead Res. | CA/NM/OR | 0.8 | 3.8 | 0.7 | 0.4 | 69.1 | 11.9 | 0.2 | 0.4 |

TABLE 1-continued

Chemical Analysis (Expressed in Weight %)

| Company | Location | Na$_2$O | K$_2$O | CaO | MgO | SiO$_2$ | Al$_2$O$_3$ | TiO$_2$ | Fe$_2$O$_3$ |
|---|---|---|---|---|---|---|---|---|---|
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 2

Physical Properties

| Company | Ionic Exch Capacity (meq/g) | H$_2$O % Adsorption | Free Silica (%) | SG | Color | pH (natural) | Pore Diameter (Å) | Hardness |
|---|---|---|---|---|---|---|---|---|
| Addwest Minerals | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague Minerals | 1.77 | | low | 2.2 | off white | | not provided | not provided |
| Zeotech | | | | | | | | |
| St. Cloud Mining | 1.60 | | 0.01< | 2.3 | white | 8.0 | 4.0 | 3.8 |
| W-Way Zeolites | 1.00 | 25.0 | NK | 2.4 | off white/pale green | 8.1 | 6.5 | NK |
| Highwood Res | 1.00 | | 10.0 | 2.0 | | 7.0 | | |
| C2C Mining | NK | NK | 5.00 | 2.3 | brown | 5.0? | NK | NK |

Synthetic zeolites can also be used in the context of the present invention. Synthetic zeolites are made by well known processes, such as gel process (sodium silicate and alumina) or clay processes (kaolin), which form a matrix to which the zeolite is added. Preferable synthetic zeolites include Linde®AW-30, Linde®AW-500, Linde®4-A and Zeolon®900.

It is envisioned that the systems and methods of the present invention can utilize, either natural, synthetic or a mixture of natural and synthetic zeolite in the generation of ferrous-form zeolite.

Ferrous-form zeolite is prepared by combining zeolite, for example clinoptilolite zeolite, with a solution of ferrous sulfate, ferrous chloride, or other like ferrous containing solutions. Ferrous-form zeolite can be generated in a batch style technique where each constituent, zeolite and ferrous containing solution, is mixed together and allowed to interact for an amount of time at an appropriate temperature. In such cases the combined constituents can be gently mixed throughout the loading period until the zeolite loading process reaches equilibrium. In addition, the ferrous-form zeolite can also be generated by circulating a ferrous containing solution over a target zeolite, for example by using an up-flow circulation system. The ferrous containing solution is recycled over the target zeolite for a period of time, number of bed volumes, or until a measured amount of ferrous-iron is loaded onto the zeolite. It should be noted that other ferrous-form zeolite generation techniques can be used, for example, down-flow circulation systems. A general target amount of loaded ferrous onto the zeolite is approximately 0.1–2.0 meq ferrous-iron/gram, although other loaded amounts of ferrous are envisioned, and is preferably about 0.6–0.8 meq ferrous-iron/gram. Factors to consider for determining the amount of loaded ferrous include, type of zeolite, type of ferrous substance, reaction conditions, e.g., time, pH, temperature, etc., and amount of $Cr^{6+}$ in target aqueous medium.

Generation of ferrous-form zeolite is also dependent on the amount of sodium ion or calcium ion displaced off of the zeolite during the ferrous iron loading process. For example, as ferrous iron contacts the zeolite, sodium ions are displaced. However, once the level of displaced sodium from the zeolite exceeds about 3 g/L, the capacity of the zeolite to load ferrous ion is restricted. As such, ferrous loading is generally performed in ferrous containing solutions having less than about 3 g/L of sodium (or calcium dependent on the type of zeolite being loaded) displaced from the zeolite. This can be accomplished by loading the ferrous iron in two or more steps, a first step where a first solution loads some ferrous iron onto the zeolite, and displaces a majority of the sodium ion from the zeolite into the solution; and a second step where a second ferrous iron containing solution is contacted to the zeolite after the majority of sodium ion has been displaced. The second ferrous containing solution ensures that the zeolite is charged with ferrous iron to an acceptable level. Additional changes of solution may be performed while loading the zeolite with ferrous iron to attain the target meq/g required for the particular ferrous-form zeolite use. Note also that it is envisioned that other means may be used to pre-strip the zeolite of sodium prior to addition with ferrous containing solutions, for example by using ammonia to strip the sodium, followed by contact with ferrous iron. Note that these same considerations can occur when the zeolite is calcium form zeolite instead of sodium form zeolite.

In one embodiment of the present invention, the contact pH between the zeolite and ferrous containing solution, for example ferrous sulfate, is from about 2.5 to about 5.5, more preferably from 3.0 and about 4.0 and most preferably from about 3.7 to about 3.9. Contact temperatures generally is above 15° C., although slightly lower temperatures are envisioned. Temperatures below 10° C. should be avoided.

Embodiments of the present invention also envision that the ferrous-form zeolite be generated under conditions that minimize oxidation of the ferrous iron. As such, ferrous-form zeolite generation is preferably conducted under non-oxidizing conditions, for example, in a non-oxidizing gas atmosphere, for example in an inert gas like nitrogen gas. In some embodiments this includes a nitrogen purge of the system as a ferrous solution is loaded onto the zeolite.

As an illustrative example, about 470 pounds of zeolite is mixed with 450 liters of a 12 g/L ferrous sulfate at a pH of 3.7, at 23° C., for about 48 hours to provide ferrous-form zeolite having 0.34 meq ferrous iron per gram zeolite. The solution after 48 hours has a sodium concentration of about 2.6 g/L. Input and output levels of the ferrous containing solutions are generally tested to ensure that the zeolite is loaded to an anticipated level. This ferrous sulfate solution, now having 2.6 g/L Na, is removed, and a second ferrous sulfate solution having 12 g/L ferrous sulfate and negligible sodium levels is contacted to the zeolite to bring the final ferrous content to 0.74 meq/gram. Note that the entire procedure is performed under nitrogen to prevent the ferrous ion from being oxidized.

Hexa-Valent Chromium Removal from Aqueous Medium Using Ferrous-Form Zeolite

The present invention provides for the removal of hexavalent chromium from aqueous media. Ferrous-form zeolite adsorbs $Cr^{+6}$ via the following general reaction:

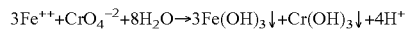

$$3Fe^{++} + CrO_4^{-2} + 8H_2O \rightarrow 3Fe(OH)_3\downarrow + Cr(OH)_3\downarrow + 4H^+$$

As illustrated in the Examples below, $Cr^{+6}$ can be removed from a $Cr^{+6}$ containing aqueous medium by simply passing the medium over ferrous-form zeolite. In general, the $Cr^{+6}$ contaminated feed is passed over the ferrous-form zeolite until the levels of $Cr^{+6}$ in the aqueous medium is reduced to predetermined levels, typically levels that no longer represent a significant health or environmental risk. As described in greater detail below, these systems can incorporate a number of different ferrous-form zeolite-aqueous medium contact techniques, including: batch style, upflow style and downflow style. In some instances, as the volume of aqueous medium treated with ferrous-form zeolite increases, a dark red-brown precipitate forms. Typically, the precipitate must be removed during the treatment of the aqueous medium, typically using some type of filtration, including size based filtration.

FIG. 1 illustrates a flow diagram of $Cr^{+6}$ removal from an aqueous medium, for example a source of $Cr^{+6}$ contaminated ground water, in accordance with the present invention. In step 102 the zeolite is loaded with an appropriate amount of ferrous iron, for example by re-circulating ferrous sulfate over zeolite until ferrous form zeolite is generated; in step 104 the $Cr^{+6}$ contaminated source is contacted with the ferrous-form zeolite, contact parameters include time, volume or visual cues. In step 106, the discharge of the $Cr^{+6}$ contaminated source from the ferrous-form zeolite is tested for $Cr^{+6}$ levels; and in step 108, the spent ferrous-form zeolite is removed and optionally replaced with fresh or unloaded ferrous-form zeolite.

Figure 2:
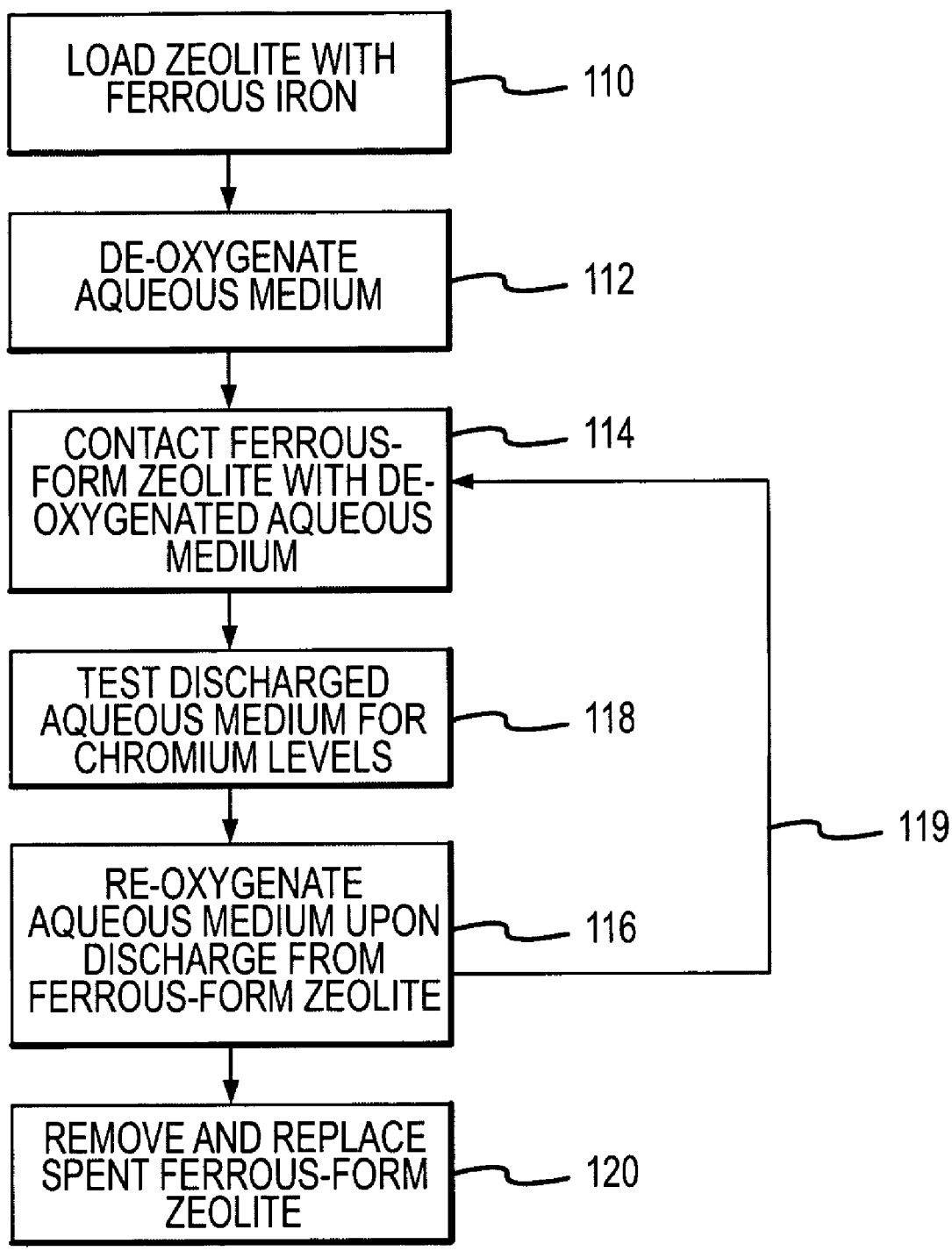
FIG. 2 illustrates a second flow diagram of $Cr^{+6}$ removal from an aqueous medium in accordance with embodiments of the present invention.

FIG. 2 illustrates another flow diagram of $Cr^{+6}$ removal from an aqueous medium, for example a source of $Cr^{+6}$ contaminated ground water, in accordance with the present invention. In step 110 the zeolite is loaded with an appropriate amount of ferrous iron, for example by re-circulating ferrous sulfate over zeolite until ferrous-form zeolite is generated, in preferred embodiments approximately 1–3 meq of ferrous iron is loaded per gram of zeolite. Note that a second contact step may be required where the displaced sodium or calcium levels exceed 3 g/L. In step 112 the aqueous medium is de-oxygenated, see below, to remove 50%, preferably 75% and most preferably about 90% of the oxygen from the $Cr^{+6}$ contaminated source or feed. In step 114 the de-oxygenated $Cr^{+6}$ contaminated source is contacted to the ferrous-form zeolite for an appropriate amount of time (note that appropriate amounts of time can be calculated based on the parameters of the chemical reactions or determined empirically from previous runs). In step 118, the discharged, and now $Cr^{6+}$ depleted and de-oxygenated aqueous medium is re-infused with oxygen so as to minimize damage to the environment and/or pipes. In step 116 the aqueous medium can be tested to determine both $Cr^{+6}$ levels and oxygen levels, where unsatisfactory levels cause the discharge to return to the de-oxygenation step 112 (shown by line 119). In step 120 the spent ferrous-form zeolite is removed and optionally replaced with fresh or unloaded ferrous-form zeolite. Note that a portion of spent or loaded ferrous-form zeolite can also be replaced with fresh ferrous-form zeolite.

The ferrous-form zeolite can act as a filtration system for removing the precipitated iron and chromium byproducts. In general, where upflow techniques are utilized, gravity moves the precipitates away from the discharge outlet. However, other filtration devices can be added at the discharge end of the column to prevent or minimize the amount of precipitate from entering the discharge. Note that where batch style contact techniques are used, centrifugation or other separating techniques may be utilized to remove the precipitates.

Note that for purposes of the present invention, a "first level" of $Cr^{+6}$ is a concentration of $Cr^{+6}$ within an un-treated (un-treated by the systems and methods of the present invention) aqueous medium, preferably drinking water on its way into or out of a conventional water treatment facility or contaminated ground water site prior to entry into a water treatment facility. The first level may exceed the acceptable discharge limits, or MCL (or its equivalent as set by the appropriate authority in other countries of the world), set by the EPA (or governing state agency) thereby requiring treatment (regardless the first level is generally the feed level of $Cr^{+6}$). A "second level" of $Cr^{+6}$ is a concentration within an aqueous solution typically lower than the acceptable MCL set by the EPA, and typically lower than the first level of $Cr^{+6}$. A "third level" or chromium is a concentration within an aqueous medium lower than the "second level." A "discharge level" of $Cr^{+6}$ is the concentration of $Cr^{+6}$ in an aqueous media being discharged from systems and methods of the present invention. The discharge level of $Cr^{+6}$ is often equal to the second or third levels of $Cr^{+6}$ but need not necessarily be the case, for example, where additional $Cr^{+6}$ is trapped and thereby removed from the aqueous medium, within the conventional treatment facility, thereby altering the level of $Cr^{+6}$ from the discharge level. The first level of $Cr^{+6}$ is generally higher than the second level of $Cr^{+6}$, which is higher than the third level of $Cr^{+6}$. Note also that the concept of a "level" of $Cr^{+6}$, i.e., first level, second level, third level, etc., in media is envisioned to be an average concentration of $Cr^{+6}$ in the water at the moment of measurement or sampling, and is dynamic and usually in flux throughout the treatment of the water by the systems and methods of the present invention. As such, the first, second, third or discharge level of $Cr^{+6}$ in an aqueous medium are envisioned as average values that may vary over the course of water treatment, as long as it does not violate the properties ascribed above.

In its broadest sense, the present invention is directed toward the extraction or removal of $Cr^{+6}$ from an aqueous media from a first level to a second level.

Systems for Removal of Hexa-Valent Chromium from Aqueous Medium

As discussed above, several different system embodiments in accordance with the present invention can be used in the contact of aqueous medium with ferrous-form zeolite. One embodiment of the present invention is described below which is a de-oxygenation upflow circulation system. Note that the systems of the present invention are generally designed to be incorporated into conventional water treatment systems, and preferably are designed to be incorporated into theses systems as stand-alone units. Typically, the incorporation of the systems and methods of the present invention do not require that the existing system be re-designed, but rather, that the $Cr^{+6}$ removal systems and methods be adapted to function before, during or after more conventional water treatment. Preferably, embodiments of the $Cr^{+6}$ removal systems and methods of the present invention are added to existing water treatment facilities as a first treatment step. Preferably, embodiments of the present invention remove an amount of $Cr^{6+}$ from a water source to meet the current MCL for chromium in the United States by the EPA, i.e., 100 parts per billion (although some states mandate levels below 50 ppb). Note also that the systems of the present invention are portable and can be designed for transport in trucks or other movable platforms to contaminated sites, for example to a well located in a high $Cr^{+6}$ contaminated ground water area.

The systems and methods of the present invention are adapted for use with existing water treatment plants as a "turn-key" or "bolt-on" process to remove $Cr^{+6}$ from aqueous media. These facilities can be used to improve the quality of aqueous media in a number of applications, including drinking water, waste water, agricultural water and ground water. In the same manner, the systems and methods of the present invention can be incorporated into new water treatment plant designs, again as "turn-key" or "bolt-on" process to the conventional water treatment facility, or integrated into the facility as designed by one of skill in the art.

Figure 3:
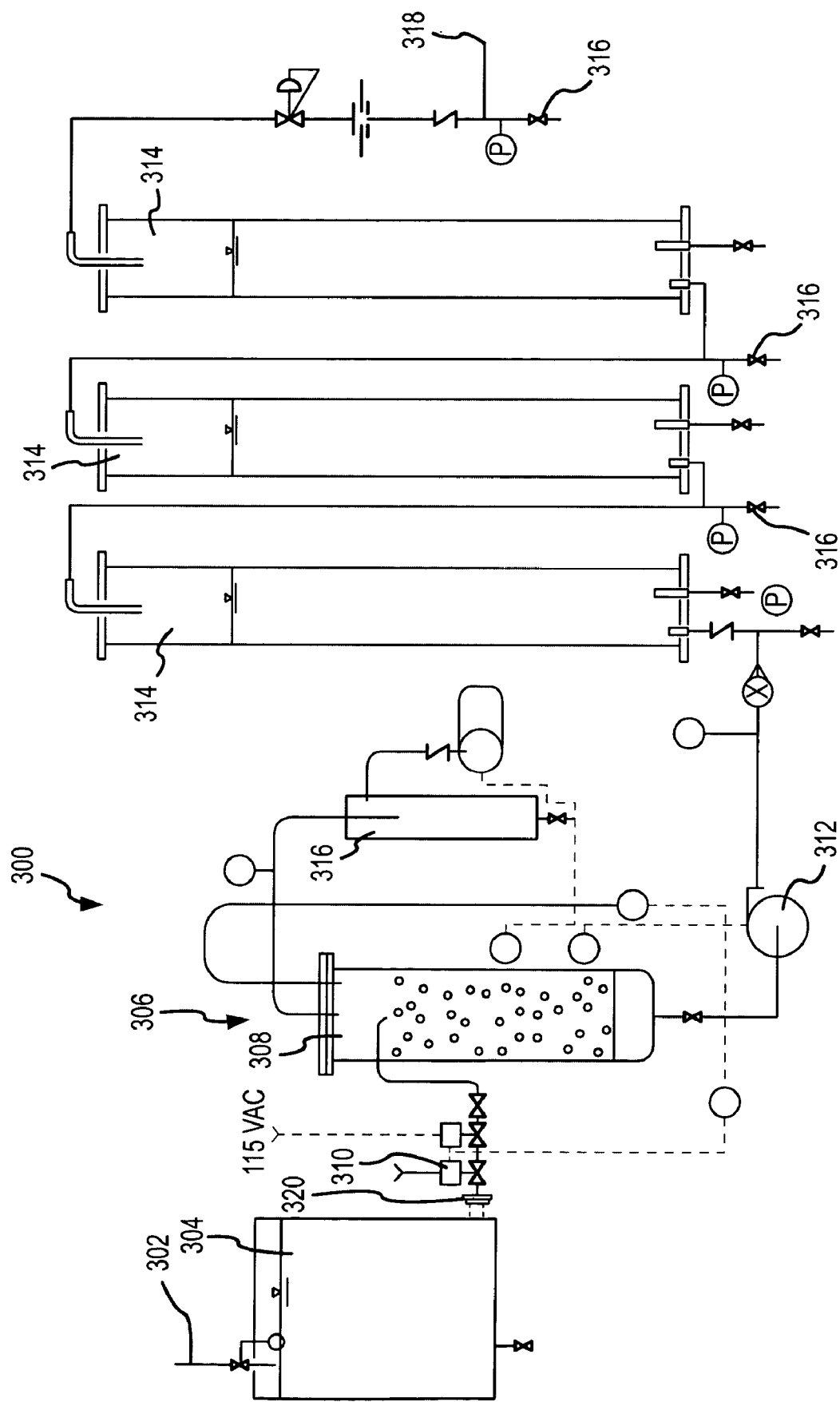
FIG. 3 illustrates a schematic of one system for chromium removal in accordance with an embodiment of the present invention.

Referring to FIG. 3, one system 300 for the removal of $Cr^{+6}$ from aqueous media is shown. An aqueous media having a first level of $Cr^{+6}$ is provided 302, preferably of a ground or surface water source, and most preferably a water source as it enters a water treatment facility, for example, as it enters a waste water treatment facility. The system preferably has a $Cr^{+6}$ sampling device for removing a sample for the measurement of $Cr^{+6}$ content to provide an approximate or average first level $Cr^{+6}$ value (although not shown, chromium levels can be determined using ICP mass spectroscopy or other like devices at an onsite or offsite laboratory). A storage tank 304 can also be present to store aqueous medium prior to treatment with the methods and systems of the present invention. The storage tank 304 can include a float to sense the content within the storage tank. The aqueous media is fed from the supply or storage tank into a de-oxygenation system 306 for the removal of the oxygen from the aqueous medium. The de-oxygenation system 306 includes an air removal tower 308 (for example a tower having a eight inch diameter and a 72 inch height) connected to vacuum pump 310 for pulling air out of the contaminated feed water prior to entering the first adsorption column. A column feed pump 312 pulls the medium from the air removal tower 308 and feeds it into the first absorption column 314 in an upflow fashion. A condensate receiver 316 captures condensate from the air removal tower 308. Medium flows between each column, with a sampling port and valve 316 provided for taking samples and testing for $Cr^{+6}$ levels between columns. A similar sample port and valve 316 exists between each column, as well as at the discharge point from the system 300. The aqueous media is discharged from the system having a second level of $Cr^{+6}$ 318, typically at a reduced $Cr^{+6}$ level from the first level of $Cr^{+6}$.

Note that filters 320 can be incorporated within the system to facilitate the removal of particulates from the media, including filters between columns that minimize the amount of ferrous-form zeolite that escapes each column run. It is also noted that the number of columns in the system 300 can be modified dependent on the required capacity of the system for removing chromium from the medium. The total number of columns is dependent on such things a flow rate of the medium, chromium levels of the feed, target chromium levels of the discharge, capacity of the ferrous-form zeolite, pH and temperature within the system, etc. It should also be noted that the columns can be connected in parallel or in a down-flow configuration, dependent on column pressures and flows. It is also noted that the system 300 can be purged with nitrogen to ensure that oxygen does not oxidize the ferrous iron and thereby reduce the capacity of the system.

Finally, as the columns in system 300 reach capacity, the first column is typically removed from the series and a newly charged column inserted after the last column in the series. In this way, systems are systematically replaced with consistent levels of ferrous-form zeolite. Note that other ferrous-form zeolite replacement strategies can be used in embodiments of the present invention, for example, replacement of a percent, e.g. 20%, of the column zeolite over pre-determined numbers of hours or bed volumes.

Having generally described the invention, the same will be more readily understood by reference to the following examples, which are provided by way of illustration and are not intended as limiting.

EXAMPLES

Example I

Generation of Ferrous-Form Zeolite

Two batches of ferrous-form zeolite were produced using the methods of the present invention to illustrate generation of ferrous-form zeolite using the methods and compositions of the present invention. In the first batch, two hundred grams of washed and screened (8×28 mesh) clinoptilolite zeolite was placed in a one-gallon container with 500 milliliters (ml) tap water and 40 grams ferrous sulfate heptahydrate. The container was closed and placed on a "rolls" or "roller" apparatus to mix the contents for about 48 hours. The weights and volumes of reagents added were such that the initial iron concentration was 16 grams/liter (g/L), the percent solids was 29%, and iron available was approximately 1.4 meq ferrous iron/gram. The air in the container caused some oxidation of the ferrous sulfate, such that considerable precipitation occurred during the contact period. The container contents were sieved on a 35 mesh sieve to remove the precipitate and any degraded zeolite. The entire amount of plush-35 mesh material was used for the $Cr^{+6}$ removal tests described below in Example 2 (see FIG. 4). Note that the material was loaded into a column for upflow contact with the six-valent chromium containing medium. X-ray fluorescence analysis of the zeolite after the chromium removal tests indicated that zeolite contained about 1.81% additional iron or a loading of about 0.65 meq ferrous iron/gram of zeolite.

A second batch of ferrous-form zeolite was generated by circulating/re-circulating a solution of ferrous sulfate upflow through a vertical six-inch diameter column of zeolite. The column contained twenty kilograms of 8×35 mesh clinoptilolite. Approximately 54.8 liters ferrous sulfate solution, having 5.6 kg of ferrous sulfate added, was circulated through the column. The weights and volumes added were such that the initial iron concentration was 20.4 grams/liter, the percent solids was 27%, and the iron available was 2.0 meq ferrous iron/gram.

Note that during the first days contact between the zeolite and ferrous sulfate a hose and fitting separated allowing the solution to be lost (see row 1 of Table 1). The solution volume was replaced with water and the same amount of ferrous sulfate. Since it is not possible to measure that solution, any transfer of iron from this volume was ignored in the data sheet calculations, see FIG. 4. X-ray fluorescence analysis of the zeolite determined that the final iron loading was incomplete, but that the loading was sufficient to test the adsorption of chromium from a solution.

Figure 4:
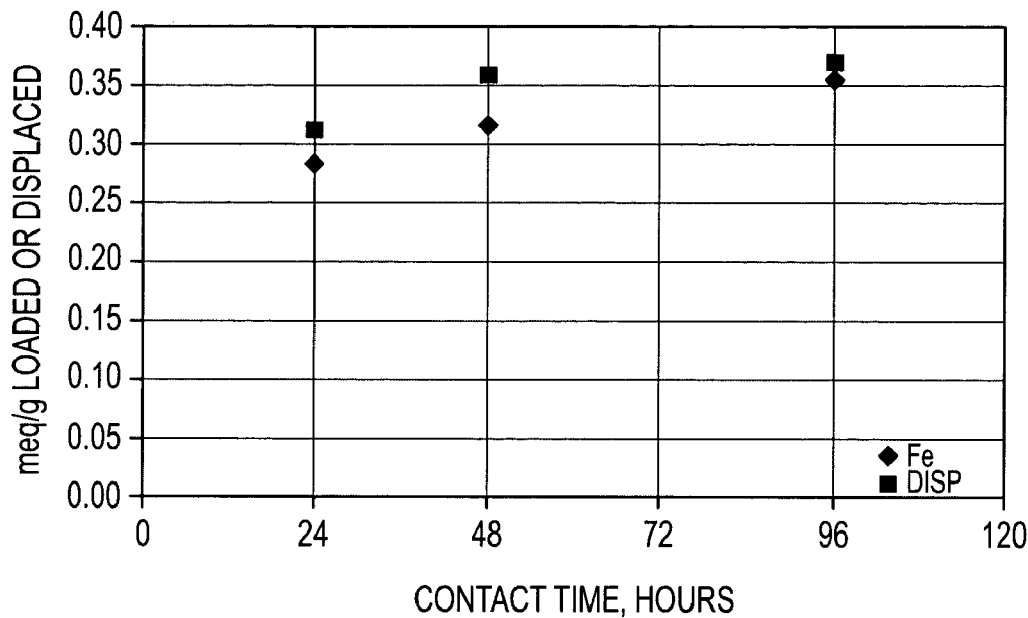
FIG. 4 illustrates ferrous iron loading onto zeolite in accordance with an embodiment of the present invention.

Table 1 and FIG. 4 illustrate that iron loading onto zeolite occurs as a function of time. At 96 hours of contact time, approximately 0.35 meq/g of ferrous iron is loaded and 0.37 meq/g of other ions are displaced. Table 2 shows that the distribution of loaded ferrous iron and eluted sodium, calcium, magnesium, potassium, and aluminum.

TABLE 3

| | | | | | | | | | | Fe | |
|---|---|---|---|---|---|---|---|---|---|---|---|
| Contact time (hr) | Liters solution | Fe (g) | Na (g) | Ca (g) | Mg (g) | K (g) | Al (g) | pH | | Load meq/g | Displace meq/g |
| 24 | 54.8 | No data | No data | No data | No data | No data | No data | No data | | 2.00 | 0 |
| 24 | 54.8 | 17550 | 1785 | 568 | 34 | 14 | 41 | 3.05 | | 0.28 | 0.31 |
| 48 | 54.8 | 17210 | 1949 | 708 | 42 | 13 | 68 | 3.18 | | 0.32 | 0.36 |
| 72 | 54.8 | 16820 | 1996 | 670 | 45 | 14 | 99 | 3.18 | | 0.35 | 0.37 |

TABLE 4

Distribution of Loaded Ferrous Iron

| Contact time (hr) | Filter Fe, grams | Added Fe, grams | Loaded Fe, g | eq | meq/g | Na | Ca | Mg | K | Al | Total |
|---|---|---|---|---|---|---|---|---|---|---|---|
| 24 | 0 | 1120 | 1120 | 40 | 2.00 | 0 | 0 | 0 | 0 | 0 | 0 |
| 24 | 962 | 1120 | 158 | 6 | 0.28 | 0.21 | 0.08 | 0.01 | 0 | 0.01 | 0.31 |
| 48 | 943 | 1120 | 177 | 6 | 0.32 | 0.23 | 0.10 | 0.01 | 0.0 | 0.02 | 0.36 |
| 96 | 922 | 1120 | 198 | 7 | 0.35 | 0.24 | 0.09 | 0.01 | 0.0 | 0.03 | 0.37 |

An additional test was performed under non-oxidizing conditions to prepare ferrous-form zeolite using embodiments of the present invention. Five hundred grams of washed and screened (20×50 mesh) clinoptilolite zeolite was placed in a one-gallon container with 1500 milliliters (ml) tap water and 80 grams ferrous sulfate heptahydrate. The container was purged with nitrogen to replace air, closed and placed on a "rolls" or "roller" apparatus to mix the contents for about 24 hours. The weights and volumes of reagents added were such that the initial iron concentration was 11 grams/liter (g/L), the percent solids was 25%, and iron available was approximately 1.15 meq ferrous iron/gram. The container contents were sieved on a 35 mesh sieve to remove the precipitate and any degraded zeolite. The solution was drained from the zeolite, having approximately 2.6 g/L sodium. A second contact of ferrous ion was prepared by taking 1500 ml of tap water having 80 grams ferrous sulfate, and adding this solution back to the zeolite. The bottle was again purged with nitrogen and rolled for approximately 48 hours. The concentrations of solid and iron available remained as above in the first contact. A final loading of ferrous ion onto the zeolite was determined to be 0.52 meq ferrous iron/gram.

Example 2

Ferrous-Form Zeolite Removes $Cr^{+6}$ from Solution

Figure 5:
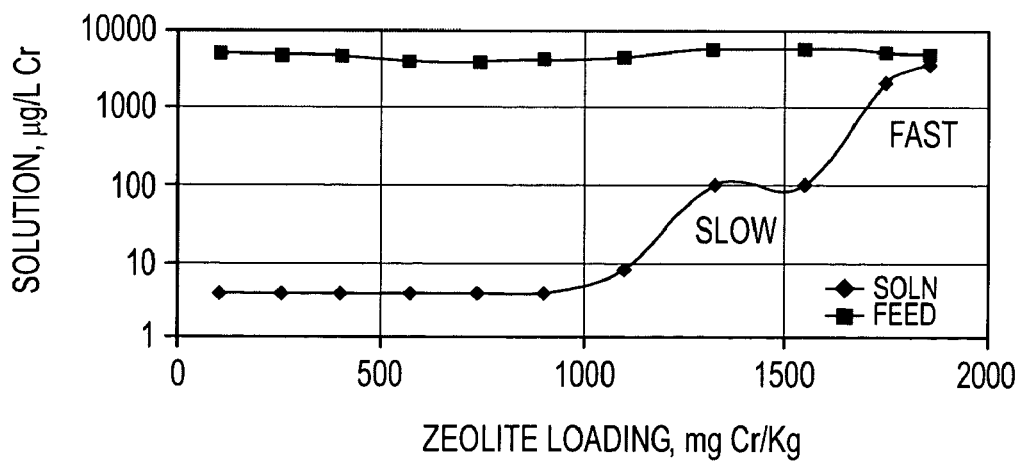
FIG. 5 illustrates $Cr^{+6}$ removal with ferrous-form zeolite in accordance with an embodiment of the present invention.
Figure 6:
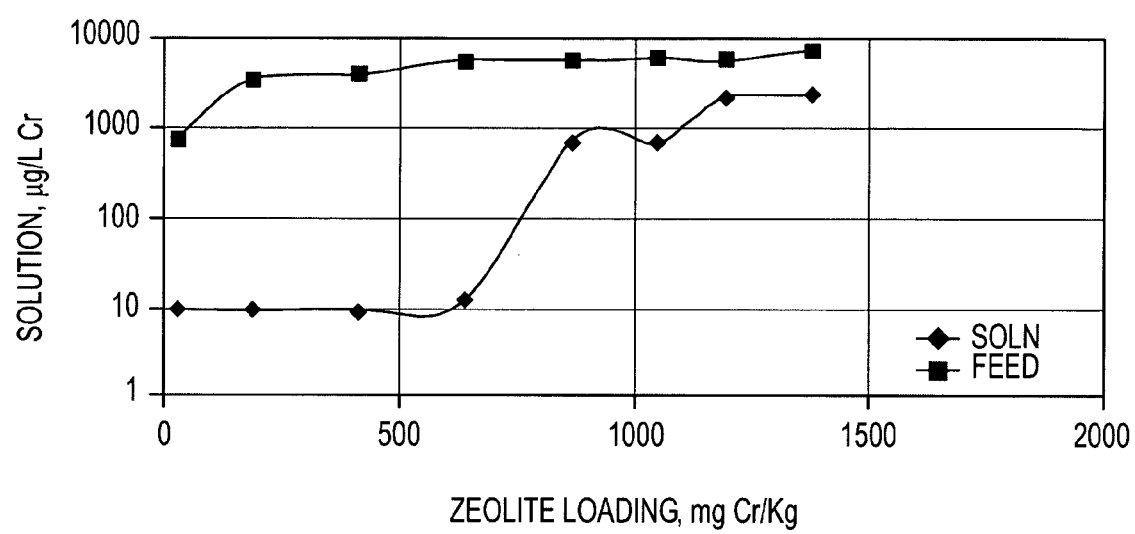
FIG. 6 illustrates $Cr^{+6}$ removal with ferrous-form zeolite in accordance with an embodiment of the present invention.

Two $Cr^{+6}$ removal tests were performed using ferrous-form zeolite (see FIGS. 5 and 6). Tap water having approximately 5,000 parts per billion $Cr^{+6}$ was added as potassium dichromate and passed upflow through the ferrous form zeolite containing column described in Table 5, Example 1. The discharge from the columns was composited, usually daily, and samples of the feed and composite discharge solution analyzed for chromium. In some cases a "grab" sample of the discharge at the end of the sample period was also taken for analysis. The detection limit for ICP mass spectroscopy was about 4 ppb chromium, so it some cases where the chromium was below detection, a 4 ppb value was used for calculations of the amount transferred to the zeolite.

As shown in Table 5, near complete chromium removal for the first 900 bend volumes of chromate contaminated water occurred, showing an ultimate capacity of 1800 mg chromium per kg of zeolite. Note that the column operated with near complete efficiency until about 1100 mg/kg of chromate was loaded onto the ferrous-form zeolite, and even after that point, a fair amount of chromate was removed. FIG. 5 graphically illustrates the data from the Table 5.

TABLE 5

Chromate Removal From Water Using Ferrous-Form Zeolite

| Day | Target mg/l | Cr µg/l | Flow ml/min | Discharge Cr Comp µg/L | Grab µg/L | Liters | Cum Bed Vols | Loading Increment mg/kg | Loading Cumulative mg/kg |
|---|---|---|---|---|---|---|---|---|---|
| 1 | 200 | 4970 | 5 | 4 | <10 | 4.3 | 20 | 107 | 107 |
| 3 | | 4710 | 5 | 4 | <10 | 6.4 | 49 | 151 | 257 |
| 4 | | 4730 | 5 | 4 | <10 | 6.2 | 77 | 147 | 404 |
| 5 | | 3980 | 5 | 4 | <10 | 8.5 | 115 | 169 | 573 |
| 6 | | 3870 | 5 | 4 | <10 | 8.8 | 155 | 170 | 743 |
| 7 | | 4260 | 5 | 4 | <10 | 7.5 | 190 | 160 | 903 |
| 8 | | 4530 | 5 | 8 | 37 | 8.7 | 229 | 197 | 1099 |
| 9 | | 5750 | 5 | 99 | 227 | 7.9 | 265 | 223 | 1322 |
| 10 | | | 3 | | | | | 0 | 1322 |
| 11 | | 5910 | 3 | 100 | 60 | 7.8 | 300 | 227 | 1549 |
| 12 | | 5190 | 9 | 2080 | 3010 | 12.5 | 357 | 194 | 1743 |
| 13 | | 4910 | 10 | 3480 | 3840 | 15.2 | 426 | 109 | 1852 |

In the second illustration, as shown in Table 6, near complete chromium removal for a first 600 bed volumes of water treated, and a capacity of greater than 1,400 mg chromium per kg of zeolite was achieved using the methods and compositions of the present invention. Table 6 illustrates significant removal of chromate from the feed to the ferrous-form zeolite (shown graphically in FIG. 6).

TABLE 6

Chromate Removal From Water Using Ferrous-Form Zeolite (Test 2)

| Day | mg/L 200 | Cr µg/l | Target Flow ml/min | Discharge Cr Comp µg/l | Discharge Cr Grab µg/l | Liters | Cum Bed Vol | Loading Increment mg/kg | Loading Cumulative mg/kg |
|---|---|---|---|---|---|---|---|---|---|
| 1 | | 766 | 5 | <10 | | 7.8 | 35 | 29 | 29 |
| 2 | | 3518 | 5 | <10 | | 9.0 | 76 | 158 | 187 |
| 3 | | 4180 | 5 | <10 | | 10.9 | 126 | 227 | 415 |
| 4 | | 5794 | 5 | 13 | 78 | 7.8 | 161 | 225 | 640 |
| 5 | | 5849 | 5 | 724 | | 9.0 | 202 | 231 | 871 |
| 6 | | 6114 | 5 | 724 | 2030 | 6.7 | 233 | 181 | 1051 |
| 7 | | 5772 | 5 | 2213 | | 8.1 | 270 | 144 | 1195 |
| 8 | | 7392 | 5 | 2356 | | 7.4 | 303 | 186 | 1382 |

A third chromium removal test was performed to illustrate the utility of embodiments the present invention for continuously removing chromium from an aqueous medium. A 250 ml buret was charged with 200 ml of ferrous-form zeolite, having 0.74 meq ferrous iron/gram. A chromium containing solution was prepared by mixing 1 ml stock potassium dichromate with 14 liters of water to provide a 100 μg/L Cr solution. The solution was fed to the ferrous-form zeolite at approximately 10 ml/min over a period of thirty plus days. Water samples were tested using standard mass spectroscopy techniques, the data shown in Table 7.

TABLE 7

$Cr^{+6}$ Removal By Ferrous-Form Zeolite

| Day | Time | Feed Batch Cr μg/L | Discharge: Target Flow 220 ml/min Liters | pH | Cr μg/L | Loading Zeolite Bed Vol. | mg/kg |
|---|---|---|---|---|---|---|---|
| 1 | 13:00 | 134 | | | | | |
| 2 | 13:15 | 83 | 13.2 | 5.83 | <4 | 60 | 8.6 |
| 3 | 8:45 | 66 | 11.6 | 6.52 | <4 | 113 | 16.1 |
| 4 | 8:30 | 103 | 15.1 | 6.23 | <4 | 181 | 25.9 |
| 5 | 8:30 | 102 | 14.7 | 5.93 | <4 | 248 | 35.5 |
| 6 | 7:30 | 103 | 13.4 | 6.40 | <4 | 309 | 44.3 |
| 8 | 8:45 | 111 | 14.8 | 6.08 | <4 | 377 | 53.9 |
| 9 | 9:00 | 109 | 14.6 | 6.02 | <4 | 443 | 63.4 |
| 10 | 8:30 | 110 | 15.6 | 6.18 | <4 | 514 | 73.5 |
| 11 | 8:15 | 104 | 12.2 | 6.35 | <4 | 569 | 81.4 |
| 12 | 8:45 | 104 | 15.6 | 6.48 | <4 | 640 | 91.5 |
| 14 | 7:00 | 99 | 12.7 | 6.66 | <5 | 698 | 99.7 |
| 15 | 8:15 | 107 | 15 | 6.59 | <5 | 766 | 109.4 |
| 16 | 9:15 | 104 | 14.7 | 6.76 | <4 | 833 | 118.9 |
| 17 | 8:15 | 104 | 13.7 | 6.88 | 6 | 895 | 127.7 |
| 18 | 8:45 | 108 | 14.5 | 7.19 | 5 | 961 | 137 |
| 19 | 7:30 | 106 | 13.5 | 7.32 | 4 | 1022 | 145.8 |
| 20 | 6:45 | 106 | 13.8 | 7.33 | 5 | 1084 | 154.7 |
| 23 | 9:00 | 108 | 16.5 | 7.01 | 6 | 1159 | 165.2 |
| 24 | 8:30 | 113 | 14.1 | 7.13 | <4 | 1223 | 174.4 |
| 25 | 8:45 | 106 | 14.3 | 7.50 | 15 | 1289 | 182.9 |
| 26 | 7:30 | 113 | 13.3 | 7.48 | 12 | 1349 | 191.0 |
| 27 | 8:00 | 126 | 14.3 | 7.53 | 20 | 1414 | 199.2 |
| 29 | 11:30 | 119 | 14.3 | 7.44 | 20 | 1479 | 207.4 |
| 30 | 9:00 | 145 | 12.6 | 7.53 | 38 | 1537 | 213.4 |
| 31 | 9:45 | 124 | 14.6 | 7.35 | 38 | 1603 | 220.4 |
| 32 | 8:15 | 106 | 13.2 | 7.40 | 50 | 1663 | 225.9 |
| 33 | 8:45 | | 14.5 | 7.46 | 59 | 1729 | 231.4 |

This experiment illustrates that over considerable periods of time the ferrous-form zeolite of the invention is effective at removing chromium from a chromium containing solution. Chromium discharge was kept at a minimum for periods of week under fairly high chromium feed levels.

The data shown in this Example provide further evidence that embodiments of the present invention are effective at removing $Cr^{+6}$ from an aqueous solution. The ferrous-form zeolite of the invention is relatively inexpensive and easy to use in an industrial scale setting, especially in the setting of removing $Cr^{+6}$ from contaminated well water.

Example 3

Treatment of Large Scale Contamination Using Ferrous-Form Zeolite

To treat and remove $Cr^{+6}$ from larger volumes of ground water the following system is proposed. Six, six inch diameter, columns are loaded with 36 inches of ferrous-form zeolite having approximately 0.5–0.7 meq ferrous iron/gram. The zeolite is of a 20×50 mesh size and is pre-sieved to remove fines. Each column is connected in series so that medium entering the first column will contact the ferrous-form zeolite of the first column and exit to the ferrous-form zeolite of the second column, and continue in series until contact with the sixth column. Discharge from the first and sixth columns is analyzed for chromium levels using ICP mass spectroscopy or other like device.

Aqueous medium feed is de-aired prior to contact with ferrous-form zeolite in the first column using a vacuum tower that pulls approximately 25 to 26 inches Hg. It is anticipated that a feed having approximately 100 ppb total chromium will be discharged from the sixth column having less than 2–6 ppb chromium. After treatment of approximately 100,000 gallons of medium, the discharge of aqueous medium will likely be increasing due to the capacity of the first column to remove chromium being inhibited. At this point it will be necessary to remove the first column and add a new column that goes in series after the original number 6 column. Removal of the first column and replacement with a new column at the end of the series of columns can continue indefinitely. Spent ferrous-form zeolite is disposed of using governing body approved technologies.

Example 4

Pilot Study for Treatment of 12 Gallons/Min Contaminated Ground Water

A pilot study was performed at Glendale, Calif. to determine the effectiveness of an embodiment of the present invention at removing chromium from larger flow rates of contaminated ground water. A series of six, six inch diameter, columns were connected in series, each column having about 5 feet in depth of 0.74 meq ferrous iron/g zeolite. The columns were connected for continuous upflow of the contaminated ground medium through the six columns. A flow rate of about 12 gallons per minute was fed continuously through the system for the duration of the pilot study.

A 25 inch Hg vacuum was pulled on the medium prior to entry of the medium to the columns to de-air the medium prior to contact with the ferrous-form zeolite. Total chromium levels were followed for five days through the six columns as is shown in Table 8.

TABLE 8

Chromium Removal At Glendale

| Day/Time | Sample | Total Chromium |
|---|---|---|
| 1/11:44 | Inf | 65.8 |
| 1/12:25 | col 1 - Eff | 65.6 |
| 1/12:21 | col 2 - Eff | 50.8 |
| 1/12:18 | col 3 - Eff | 37.2 |
| 1/12:16 | col 4 - Eff | 24.2 |
| 1/12:11 | col 5 - Eff | 14.9 |
| 1/11:38 | Eff | 9.3 |
| 2/10:35 | Inf | 56.3 |
| 2/10:29 | col 1 - Eff | 46.3 |
| 2/10:28 | col 2 - Eff | 34.2 |
| 2/10:27 | col 3 - Eff | 27.6 |
| 2/10:26 | col 4 - Eff | 21.2 |
| 2/10:25 | col 5 - Eff | 13.2 |
| 2/10:32 | Eff | 7 |
| 5/12:26 | Inf | 64.2 |
| 5/12:24 | col 1 - Eff | 26.1 |
| 5/12:22 | col 2 - Eff | 2.9 |
| 5/12:20 | col 3 - Eff | 0.5 |
| 5/12:17 | col 4 - Eff | 0.6 |
| 5/12:15 | col 5 - Eff | 1.2 |
| 5/12:14 | Eff | 1.4 |

The data shown in Table 8 illustrates that the present invention is useful in treating larger volumes of contaminated water. Over a period of 5 days, contaminated water having approximately 64 ppb chromium was treated and discharged with 9.3 ppb after day 1, 7 ppb after day 2 and less than 2 ppb after day 5. The data illustrates the effectiveness of embodiments of the present invention for treating large volumes of continuous feed water, for example water entering a water treatment plant.

It will be clear that the invention is well adapted to attain the ends and advantages mentioned as well as those inherent therein. While a presently preferred embodiment has been described for purposes of disclosure, various changes and modifications may be made which will readily suggest themselves to those skilled in the art and which are encompassed in the spirit of the invention disclosed herein and as defined in the appended claims.

What is claimed is:

1. A system for removing chromium form a target medium, the system comprising: a de-airing station for removal of air from the target medium; a chromium adsorption column for removal of chromium from the target medium; and a re-airing station for addition of air to the target medium after chromium has been removed from the target medium; wherein the target medium is moved from the de-airing station to the chromium adsorption column to the re-airing station wherein the chromium adsorption is composed of ferrous-form zeolite.

2. The system of claim 1 wherein the chromium adsorption column is a series of connected columns for housing the ferrous-form zeolite.

3. The system of claim 1 wherein the ferrous-form zeolite has approximately 0.5 to 2.0 meq ferrous iron/g.

* * * * *